3,419,553
FLUORINATED PHENOTHIAZINE COMPOUNDS
Jack Bernstein, Harry L. Yale, and Kathryn A. Losee, New Brunswick, N.J., assignors to E. R. Squibb & Sons, Inc., New York, N.Y., a corporation of Delaware
No Drawing. Filed May 25, 1966, Ser. No. 552,692
7 Claims. (Cl. 260—243)

ABSTRACT OF THE DISCLOSURE

This invention relates to novel 10-(amino alkyl) fluorinated phenothiazines which are useful as antibacterial agents.

---

This invention relates to new 10-(amino alkyl) fluorinated phenothiazines. The novel compounds of this invention are of value as antibacterial agents.

The new compounds of this invention are fluorinated phenothiazine derivatives represented by the general formula (I)

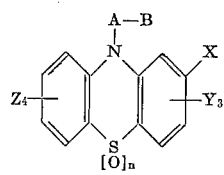

wherein X represents H, F or $CF_3$; Y represents H or F; Z represents H or F; at least one of Y and Z being F, $n$ represents 0, 1 or 2; A represents a lower alkylene radical of at least two carbon atoms; and B represents a basic saturated nitrogen containing radical Among the suitable radicals represented by the symbol B are amino, (lower alkyl)amino, such as methyl amino, ethyl amino and the like, di(lower alkyl)amino, such as dimethyl amino, diethyl amino and the like, (hydroxy-lower alkyl)amino, such as hydroxy-ethylamino and the like, di(hydroxy-lower alkyl)amino, such as di(hydroxy-ethyl)amino and the like, (aryl-lower alkyl)amino, such as benzyl amino, phenethyl amino and the like, (lower alkyl) (aryl-lower alkyl)amino, and saturated nitrogen heterocyclics having 5 to 7 atoms in the ring and which may have one additional hetero atom in the ring. A substituent may also be attached to the nitrogen heterocyclic.

Heterocyclics represented by B may be exemplified by piperidino; (lower alkyl) piperidino [e.g., 2,3, or 4-alkoxy) piperidino]; pyrrolidino; (lower alkyl) pyrrolidino; (lower alkoxy) pyrrolidino; morpholino; (lower alkyl) morpholino; (lower alkoxy) morpholino; thiamorpholino; (lower alkyl)thiamorpholino; (lower alkoxy) thiamorpholino; piperazino; $N^4$-(lower alkyl) piperazino [e.g., $N^4$-methylpiperazino]; $N^4$-(lower alkoxy piperazino; $N^4$-(hydroxy-lower alkyl) piperazino [e.g., $N^4$-(2-hydroxyethyl) piperazino]; $N^4$-(alkanoyloxy-lower alkyl)piperazino [e.g., $N^4$-(2-acetoxyethyl) piperazino, $N^4$-(2-heptanoyloxyethyl) piperazino, $N^4$-(2-dodecanoyloxyethyl) piperazino]; $N^4$-(hydroxy-lower alkoxy-lower alkyl) piperazino [e.g., $N^4$-(2-hydroxyethoxyethyl) piperazino]; $N^4$-{di(lower alkyl) amino-(lower alkyl)} piperazino [e.g., $N^4$-dimethyl-aminoethylpiperazino]; $N^4$-{di(lower alkyl) amino-(lower alkoxy-lower alkyl} piperazino [e.g., $N^4$-(2-dimethylaminoethoxy-ethyl) piperazino]; homopiperazino and substituted homopiperazino [e.g., $N^4$-ethylhomopiperazino, N-benzylhomopiperazino, and $N^4$-(hydroxyethyl) homopiperazino]. The terms "lower alkyl," "lower alkoxy," and "lower alkylene" as employed herein, include both straight and branched chain radicals of less than eight carbon atoms.

The term "alkanoyloxy" includes radicals of up to 14 carbon atoms.

It is readily apparent from the above that it is intended that the linkage betwen the heterocyclic radical (B) and the alkylene radical (A) may be through any carbon or nitrogen atom in the heterocyclic ring, and that R may be linked to any position on the ring having a replaceable hydrogen atom.

This invention also includes salts of the above defined bases formed with non-toxic organic and inorganic acids. Such salts, are easily prepared by mehtods known to the art. The base is reacted with either the calculated amount of organic or inorganic acid in aqueous miscible solvents, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methylsulfonic, ethanesulfonic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example, 8-chlorotheophylline and 8-bromotheophylline. Exemplary of such inorganic salts are those with hydrochloric, hydrobromic, sulfuric, sulfamic, phosphoric and nitric acids. Of course these salts may also be prepared by the classical method of double decomposition of appropriate salts which is well known to the art.

The compounds of this invention have utility as antibacterial agents.

The desired fluorinated phenothiazines of the present invention as indicated by Formula II.

(II)

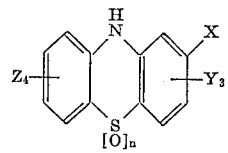

wherein the symbols have the same meaning as hereinbefore defined may be prepared by several synthetic methods. Thus in the type in which one of the aromatic rings is completely substituted by fluorine or fluorine and trifluoromethyl, the preferred method of preparation is the reaction of an aminobenzenethiol with hexafluorobenzene or octafluorotoluene to form the fluorinated 2-phenylthioaniline or fluorinated 2-(p-tolylthio)aniline and subsequent ring-closure to the substituted phenothiazine by heating at elevated temperatures. This series of reactions may be carried out stepwise or without isolation of the intermediates. In the type in which neither of the rings is completely substituted, X and Z in Formula I both being hydrogen, the preferred method of preparation of the phenothiazine is the reaction of an aminobenzenethiol with pentafluorobenzene to form a 2-(tetrafluorophenylthio)aniline. Ring-closure is then effected by converting the thioaniline to the corresponding formanilide followed by treatment with potassium carbonate in dimethylformamide. The N-formyl derivative of the fluorinated phenothiazine thus formed is hydrolyzed to the phenothiazine by treatment with aqueous-alcoholic sodium hydroxide.

These procedures yield compounds of Formula II, wherein $n$ is 0. To obtain those derivatives wherein $n$ is 2, a compound of Formula II, $n$ is 0, is treated first with a mixture of acetyl chloride and acetic anhydride followed by treatment with a peracid such as peracetic acid (or hydrogen peroxide and acetic acid).

Suitable aminobenzenethiols utilizable as starting reagents in these reactions include 2-aminobenzenethiol, 2-amino-4-fluorobenzenethiol, 2-amino-4-(trifluoromethyl)benzenethiol, 2-amino-3,4,5,6 - tetrafluorobenzenethiol, and 2-amino-3,5,6-trifluorobenzenethiol.

Suitable fluorinated benzenes and toluenes utilizable as reagents in these reactions include pentafluorobenzene, hexafluorobenzene and octafluorotoluene.

The compounds of Formula I may be produced by reacting compounds of Formula II, wherein $n$ is 0 or 2 with a haloacyl halide, preferably wherein the halides are chlorine, e.g., α - chloracetyl chloride, β - chloropropionyl chloride, β-chloro-α-methylpropionyl chloride, chlorobutyryl chloride or the like. This reaction, in which the haloacyl halide is preferably utilized in excess, produces an intermediate of the formula (III)
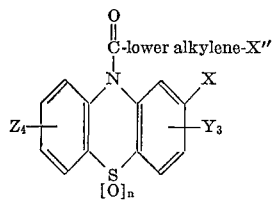

wherein $X''$ in the above formula represents a halogen atom.

Reduction of the compound of Formula III with a metal hydride such as lithium aluminum hydride in an organic solvent produces a compound of the formula (IV)
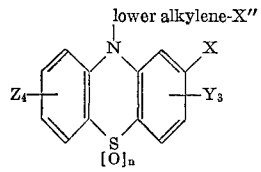

The compound of Formula IV will then react with an amine (including a heterocyclic), preferably used in excess and in a non-aqueous organic solvent such as toluene, to produce the product of Formula I.

Alternatively, the compound of Formula III may first be condensed with the amine and then the resulting condensation product of the formula (V)
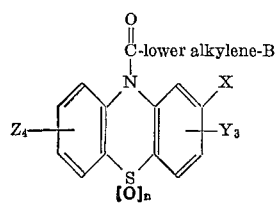

reduced with a metal hydride in the same manner described previously.

Alternatively, a compound of the Formula II may be reacted with an aminoalkyl halide, e.g., dimethylaminopropyl chloride, diethylaminoethyl chloride or 3-(4-methylpiperazinyl)propyl chloride in the presence of an alkaline condensing agent, e.g., sodium hydride, sodium amide, or sodium hydroxide, to give a compound of the Formula I.

As a further alternative, a compound of the Formula II may be reacted with an Ω-haloalkylenehalide, e.g. trimethylene chlorobromide, tetramethylene chlorobromide or hexamethylene chlorobromide in the presence of an alkaline condensing agent, e.g., sodium hydride, to give the 10-(Ω-haloalkylene) intermediate, which is then reacted with a nitrogen-containing radical of less than 12 carbon atoms as defined above to give a compound of Formula I.

Compounds of Formula I, in which $n$ is 1, may be obtained by treatment of a compound of Formula I, in which $n$ is 0, with oxalic acid to form an oxalic acid salt, followed by treatment with aqueous hydrogen peroxide.

Example 1.—Preparation of 10-[3-(dimethylamino)propyl] - 1,3,4-trifluoro-2 - (trifluoromethyl)phenothiazine hydrochloride (a) 1,3,4 - trifluoro - 2 - (trifluoromethyl)phenothiazine.—A solution of octafluorotoluene (23.6 g.), 2-aminobenzenethiol (12.5 g.), and dimethylformamide (100 ml.) is refluxed for 5½ hours under nitrogen. The solvent is removed under reduced pressure and the residue poured into water. A light yellow solid precipitates. This is extracted into ether; the ether is dried over magnesium sulfate, filtered and allowed to evaporate at room temperature to yield a yellow solid. After recrystallization from 600 ml. of hexane, the compound weighs 18.0 g. and melts at about 124–125°. A second crop may be obtained from the hexane mother liquor, which after sublimation at 130° and 0.1 mm. weighs 4.4 g. and melts at about 124–125°.

(b) 10-[3-(dimethylamino)propyl] - 1,3,4-trifluoro-2-(trifluoromethyl)phenothiazine.—1,3,4-trifluoro - 2 - (trifluoromethyl)phenothiazine (12.8 g.) and dimethylaminopropyl chloride (19.4 g.) are dissolved in 200 ml. of dry acetone and with vigorous stirring solid sodium hydroxide (9.6 g.) is added all at once. The resulting mixture is refluxed with stirring for 5 hours. After about 3 hours, a reddish-blue color forms which gradually changes to brown and a new finely divided precipitate forms. The mixture is cooled and the solid filtered. The acetone is removed under reduced pressure. The dark brown residue is poured into about 500 ml. of water and is made strongly acid with 20% hydrochloric acid. The mixture is extracted with ether and the layers separated. The ether is re-extracted with about 100 ml. 5% hydrochloric acid. The combined aqueous extracts are cooled and made strongly alkaline with 50% NaOH. A dark oil separated which is extracted with ether. The ether is dried over magnesium sulfate, treated with Darco, and filtered. The ether is removed and the crude residue is fractionated to yield 10.0 g. of 10-[3-(dimethylamino)-propyl]-1,3,4-trifluoro - 2-(trifluoromethyl)phenothiazine as a viscous yellow oil boiling at about 145–150° at 0.3 mm.

(c) 10-[3-(dimethylamino)propyl] - 1,3,4-trifluoro-2-(trifluoromethyl)phenothiazine hydrochloride.—A solution of 10.0 g. of 10-[3-(dimethylamino)propyl]1,3,4-trifluoro-2-(trifluoromethyl)phenothiazine in about 250 ml. of anhydrous ether is treated with etheral hydrogen chloride. A gummy precipitate forms which is granulated by trituration with ether and standing. Eight grams of this material is purified by dissolving it in 25 ml. of n-butanol and precipitating with about 650 ml. of ether. The 10-[3-(dimethylamino)propyl] -1,3,4-trifluoro-2-(trifluoromethyl) phenothiazine hydrochloride, so obtained, melts at about 168–170°.

Example 2.—Alternate procedure for preparation of 1,3,4-trifluoro-2-(trifluoromethyl) phenothiazine (a) 2-[heptafluoro-p-tolyl)thio]aniline.—A solution of 11.8 g. of octafluorotoluene and 6.3 g. of 2-aminobenzenethiol in 50 ml. of dimethylformamide is heated with stirring under nitrogen at 100–110° for 6 hours. The solvent is removed under reduced pressure and the viscous residue is poured into water. A brown oily mass settles to the bottom of the flask. This is extracted into ether. The ether is dried over magnesium sulfate, filtered, and the filtrate made strongly acid with 3.5 N ethereal hydrogen chloride. A white crystalline precipitate forms, is filtered and dried to yield 15.5 g. of hydrochloride melting at about 169–172°. The free base is obtained by suspending the above solid in 300 ml. of water, adding 4.2 g. of solid sodium bicarbonate and extracting the oil which forms into ether. The ether is dried over magnesium sulfate and allowed to evaporate at room temperature to yield 12.0 g. of product melting at about 43–45°. After recrystallization from hexane the product melts at about 45–46°.

(b) 1,3,4-trifluoro-2-(trifluoromethyl)phenothiazine.— A solution of 12.0 g. of 2-[(heptafluoro-p-tolyl)thio]aniline in 50 ml. of dimethylformamide is refluxed under nitrogen for 6 hours. The cooled solution is poured onto cracked ice and the yellow-brown solid which precipitates is filtered and dried to yield 10.0 g. of product melting at about 116–119°. After sublimation at 120° and 0.1 mm. the product melts at about 124–125°.

Example 3.—Preparation of 10-[3-(dimethylaminopropyl)]-1,3,4,6,7,8,9-heptafluoro-2-(trifluoromethyl)phenothiazine hydrochloride (a) 2-amino-3,4,5,6-tetrafluorobenzene sulfonic acid.— To 14.0 g. of chlorosulfonic acid at 25° is added dropwise with stirring 16.5 g. 2,3,4,5-tetrafluoroaniline maintaining the temperature below 25°. After complete addition, 100 ml. of tetrachlorethane is added and the resulting mixture is refluxed for 3 hours. The light tan solid which forms is filtered, washed with ether, and air-dried to yield 25.0 g. of product melting at about 272–276° (dec.).

(b) 2-amino-3,4,5,6-tetrafluoroenzenesulfonic acid, sodium salt.—To a solution of 4.8 g. of sodium in 300 ml. of absolute alcohol is rapidly added with stirring a hot solution of 51.0 g. of 2-amino-3,4,5,6-tetrafluorobenzenesulfonic acid in 1200 ml. of absolute alcohol. A light tan crystalline precipitate forms immediately. The mixture is allowed to stir overnight at room temperature. The solid is filtered and air-dried to yield 31.0 g. of product which does not melt below 300°. A second crop of 11.0 g. may be obtained by concentrating the filtrate and filtering off the crystalline product which precipitates.

(c) 2-amino-3,4,5,6-tetrafluorobenzenesulfonyl chloride.—A mixture of 5.34 g. of 2-amino-3,4,5,6-tetrafluorobenzene-sulfonic acid, sodium salt and 2.1 g. of phosphorus pentachloride is heated with stirring in an oil bath at 170–180° for 6 hours. The mixture becomes dark brown and there is slight refluxing of a small amount of liquid. To the cooled pasty mass is added cracked ice and water and the resulting mixture stirred at room temperature for 2 hours. The dark brown granular solid which forms is filtered and dried. The compound is purified by sublimation at 140–150° and 0.1 mm. to yield the product melting at about 57.5–59°.

(d) 2 - amino - 3,4,5,6-tetrafluorobenzenethiol.—To a warm mixture of tin and hydrochloric acid, there is added in small portions the 2-amino-3,4,5,6-tetrafluorobenzene-sulfonyl chloride. A vigorous reaction occurs and a clear solution is obtained. The reaction mixture is then cooled and hydrogen sulfide passed into the solution with vigorous stirring to precipitate the tin. The mixture is filtered and the filtrate concentrated to dryness. The residue is dissolved in water and neutralized. The mixture is extracted with ether, the ether extracts dried over magnesium sulfate and then concentrated in an atmosphere of nitrogen to leave as the residue the desired 2-amino-3,4,5,6-tetrafluorobenzenethiol.

(e) 1,3,4,6,7,8,9-heptafluoro-2-(trifluoromethyl)phenothiazine.—A solution of 23.6 g. of octafluorotoluene and 19.7 g. of 2-amino-3,4,5,6-tetrafluorobenzenethiol in 100 ml. of dimethylformamide is refluxed under nitrogen for 6 hours. The dimethylformamide is removed under reduced pressure and the residue poured into ice water. The mixture is extracted with ether, and the ether extracts dried over anhydrous magnesium sulfate. The ether solution is filtered and allowed to evaporate at room temperature to yield the desired 2-(trifluoromethyl)-1,3,4,6,7,8,9-hepta-fluorophenothiazine. The phenothiazine may be purified by crystallization from hexane or by sublimation under reduced pressure.

(f) 10-[3-(dimethylamino)propyl] - 1,3,4,6,7,8,9-heptafluoro-2-(trifluoromethyl)phenothiazine hydrochloride.— Following the procedure of Example 1 (b, c), but substituting 1,3,4,6,7,8,9-heptafluoro - 2-(trifluoromethyl)phenothiazine for the 1,3,4-trifluoro-2-(trifluoromethyl)phenothiazine, there is obtained the desired 10-[3-(dimethylamino)propyl] - 1,3,4,6,7,8,9 - heptafluoro-2-(trifluoromethyl)phenothiazine, hydrochloride.

Example 4.—Preparation of 10-[3-(dimethylamino)-propyl]-1,2,3,4-tetrafluorophenothiazine hydrochloride (a) o-[(Pentafluorophenyl)thio]aniline.—A solution of 37.2 g. of hexafluorobenzene and 2.5 g. of 2-aminobenzenethiol in 100 ml. of dimethylformamide is heated at 100–105° under nitrogen for 3 hours. The solvent is removed under reduced pressure and the residue poured into water. An oily precipitate forms which is extracted into ether. The ether is dried, filtered and allowed to evaporate at room temperature to yield a viscous residue which is triturated with hexane to yield 3.0 g. of a solid melting at about 108–115°. This solid is the known 2,2'-(2,3,5,6-tetrafluoro - p - phenylenedithio)dianiline. The hexane filtrate from the above is allowed to evaporate at room temperature to yield a crystalline product melting at about 59–61°. After sublimation at 100° and 0.6 mm., the o-[(pentafluorophenyl)thio]aniline obtained melts at about 66–68°.

(b) 1,2,3,4-tetrafluorophenothiazine.—A solution of 730 mg. of o-[(pentafluorophenyl)thio]aniline in 10 ml. of dimethylformamide is refluxed for 6 hours. The solvent is removed under reduced pressure and the residue is poured into water. The solid which precipitates is extracted into ether. The ether is dried over magnesium sulfate, filtered, and allowed to evaporate at room temperature to yield the product. After sublimation at 120° and 0.1 mm. the 1,2,3,4-tetrafluorophenothiazine melts at about 130–132°.

(c) 10-[3 - (dimethylamino)propyl] - 1,2,3,4 - tetrafluorophenothiazine hydrochloride.—Following the procedure of Example 1 (b, c), but substituting 1,2,3,4-tetrafluorophenothiazine for the 1,3,4-trifluoro-2-(trifluoromethyl)phenothiazine, there is obtained the desired 10-[3-(dimethylamino)propyl]-1,2,3,4 - tetrafluorophenothiazine, hydrochloride.

Example 5.—Preparation of 10-[3-(dimethylamino)propyl]-1,3,4-trifluorophenothiazine hydrochloride (a) o-[(2,3,5,6-tetrafluorophenyl)thio]aniline.—A hot solution of o-aminobenzenethiol (14.8 g.) and sodium hydroxide (6.7 g.) in ethylene glycol (40 ml.) is added rapidly to a boiling solution of pentafluorobenzene (20.0 g.) in pyridine (120 ml.). After 30 minutes refluxing, the mixture is poured on cracked ice and is made strongly acid with 20% hydrochloric acid. A tan crystalline solid forms and is filtered and dried to yield 28.0 g. of product. It is recrystallized from hexane and melts at about 65–67°.

(b) 2'-[(2,3,5,6-tetrafluorophenyl)thio]formanilide.— A solution of o-[(2,3,5,6-tetrafluorophenyl)thio]aniline (28.0 g.) in 140 cc. of 98–100% formic acid is refluxed for 1 hour, cooled, and poured onto cracked ice. A light colored crystalline precipitate forms which is filtered and washed with water to yield 28.5 g. of product. After recrystallization from hexane the compound melts at about 117–118°.

(c) 1,3,4-trifluorophenothiazine.—Anhydrous, micronized potassium carbonate (16.6 g.) is suspended in dimethylformamide (150 ml.) and the mixture heated to boiling. 2'-[(2,3,5,6 - tetrafluorophenyl)thio]formanilide (18.1 g.) is then added portionwise over 1 hour. The mixture is then refluxed for 1 hour and 8.3 g. of anhydrous, micronized potassium carbonate added. The resulting mixture is refluxed an additional hour. The mixture is filtered and the solvent removed from the filtrate under reduced pressure. The viscous dark blue residue is refluxed for 1 hour with 50 ml. alcohol, 10 ml. of 50% sodium hydroxide and 10 ml. of water. The alcohol is removed under reduced pressure and the residue extracted with 2×150 ml. ether. The ether is dried over magnesium sulfate, treated with Darco, filtered, and allowed to evaporate at room temperature to yield 14.0 g. of residue. This is sublimed at 140°, and 1 mm. to yield 7 g. of product melting at about 88–90°.

(d) 10-[3-(dimethylamino)propyl] - 1,3,4 - trifluorophenothiazine hydrochloride.—1,3,4 - trifluorophenothiazine (5.1 g.) and 3-(dimethylamino)propyl chloride (9.7 g.) are dissolved in 100 ml. of acetone and with vigorous stirring, powdered sodium hydroxide (4.8 g.) is added all at once. The resulting mixture is refluxed with stirring for 3 hours. The solid is then filtered. The acetone is removed from the filtrate yielding a viscous residue. This residue is dissolved in dry ether and excess ethereal hydrogen chloride is added. A gummy precipitate forms which crystallizes on trituration with ether. This is filtered to yield 5.5 g. of product. The 10-[3-(dimethylamino)propyl]-1,3,4-trifluorophenothiazine hydrochloride melts at about 148–150° after crystallization from a mixture of acetone and ether.

Example 6.—Preparation of 4{3-[1,3,4 - trifluoro - 2-(trifluoromethyl)-10-phenothiazinyl]propyl} - 1-piperazineethanol dimaleate (a) 10-(3-chloropropyl) - 1,3,4 - trifluoro-2-(trifluoromethyl)phenothiazine.—A mixture of 32.4 g. of 1,3,4-trifluoro-2-(trifluoromethyl)phenothiazine and 45 g. of trimethylene chlorobromide in 500 ml. of ethyl methyl ketone is stirred vigorously and 24.0 g. of powdered sodium hydroxide added. The mixture is refluxed for 10 hours, filtered and concentrated under reduced pressure to yield as a residue the desired 10-(3-chloropropyl)-1,3,4-trifluoro-2 - (trifluoromethyl)phenothiazine, which may be purified by fractional crystallization from heptane.

(b) 4-{3-[1,3,4-trifluoro - 2 - (trifluoromethyl) - 10-phenothiazinyl]propyl}-1-piperazineethanol dimaleate.— A mixture of 20.0 g. of 10-(3-chloropropyl)-1,3,4-trifluoro-2-(trifluoromethyl)phenothiazine, 13.0 g. of 1-piperazineethanol, 7.8 g. of sodium iodide and 200 ml. of ethyl methyl ketone is stirred and heated to reflux for 20 hours. The mixture is concentrated under reduced pressure and the residue poured into dilute hydrochloric acid. The mixture is then shaken with ether to remove the undissolved organic material and the aqueous acid layer is separated, cooled, and made alkaline with 40% aqueous potassium hydroxide. The solution is then saturated with potassium carbonate and extracted three times with ether. The ether extracts are washed with a saturated sodium chloride solution, dried over anhydrous magnesium sulfate, and concentrated to remove the solvent. The residue is fractionally distilled under reduced pressure to yield 4-{3-[1,3,4-trifluoro-2-(trifluoromethyl)-10-phenothiazinyl]propyl}-1-piperazineethanol. This base is dissolved in hot acetonitrile and is added to a solution of maleic acid in hot acetonitrile. Ether is added to the cooled mixture and the maleic acid salt of 4-{3-[1,3,4-trifluoro-2-(trifluoromethyl) - 10 - phenothiazinyl]propyl}-1-piperazineethanol is recovered by filtration. It may be recrystallized from ethyl methyl ketone.

Example 7.—Preparation of 10-[3-(dimethylamino)propyl] - 1,3,4-trifluoro-2-(trifluoromethyl)phenothiazine-5-oxide oxalate To 12.2 g. of 10-[3-(dimethylamino)propyl] - 1,3,4,-trifluoro-2-(trifluoromethyl)phenothiazine in 200 ml. of 95% ethanol there is added 2.7 g. of oxalic acid in 50 ml. of ethanol. There is an immediate precipitation of the oxalate salt. To the mixture there is added 100 ml. of water and 3.4 ml. of 30% hydrogen peroxide. The reaction mixture is refluxed for 18 hours and is then concentrated under reduced pressure to yield the desired oxalic acid salt of 10-[3-(dimethyl)propyl] - 1,3,4 - trifluoro-2-(trifluoromethyl)penothiazine-5-oxide.

Example 8.—Preparation of 10 - [3-(dimethylamino)propyl] - 1,3,4 - trifluoro-2-(trifluoromethyl)penothiazine-5,5-dioxide, hydrochloride (a) 1,3,4 - trifluoro-2-(trifluoromethyl)phenothiazine-5,5-dioxide.—A mixture of 16.2 g. of 1,3,4-trifluoro-2-(trifluoromethyl)-phenothiazine, 25 ml. of acetyl chloride and 50 ml. of acetic anhydride is refluxed for 4 hours on a steam bath and the concentrated under reduced pressure. The residue is dissolved in 50 ml. of acetic acid and 17 ml. of 30% hydrogen peroxide is added. The mixture is heated gradually to boiling. An exothermic reaction occurs and the source of heat removed until this reaction subsides. The mixture is then heated for 4 additional hours, concentrated, and cooled to give the crude product. This is crystallized from aqueous ethanol to yield the desired 1,3,4-trifluoro-2-(trifluoromethyl) phenothiazine-5,5-dioxide.

(b) 10-[3-(dimethylamino)propyl] - 1,3,4 - trifluoro-2 - (trifluoromethyl)phenothiazine-5,5-dioxide hydrochloride.—Following the procedure of Example 1 (b, c) but substituting the 1,3,4-trifluoro - 2 - (trifluoromethyl) phenothiazine-5,5-dioxide for the 1,3,4 - trifluoro-2-(trifluoromethyl)phenothiazine, there is obtained 10[3-(dimethylamino)propyl] - 1,3,4 - trifluoro - 2 - (trifluoromethyl)phenothiazine-5,5-dioxide, hydrochloride.

Example 9.—Preparation of 10-[3 - (dimethylamino) propyl] - 1,2,3,4,6,7,8,9-octafluorophenothiazine, hydrochloride Following the procedure of Example 4, but substituting an equivalent quantity of 2-amino-3,4,5,6-tetrafluorobenzenethiol (Example 3, d) for the 2-aminobenzenethiol, there is obtained the desired 10-[3-(dimethylamino)propyl] - 1,2,3,4,6,7,8,9 - octafluorophenothiazine, hydrochloride.

Example 10.—Preparation of 10 - [3-(dimethylamino)propyl] - 6,7,8,9 - tetrafluoro-2-(trifluoromethyl)phenothiazine, hydrochloride Following the procedure of Example 4 but substituting 2-amino-4-(trifluoromethyl)benzenethiol for the 2-aminobenzenethiol there is obtained the desired 10-[3-(dimethylamino)propyl] - 6,7,8,9 - tetrafluoro - 2 - (trifluoromethyl)phenothiazine hydrochloride.

Example 11.—Preparation of 4-{3-[1,3,4-trifluoro-2-(trifluoromethyl)-10-phenothiazinyl]propyl} - 1 - piperazineethyl heptonoate, dihydrochloride To a stirred solution of 25 g. of 4-{3-[1,3,4-trifluoro-2-(trifluoromethyl) - 10 - phenothiazinyl]propyl}-1-piperazineethanol in 300 ml. of dry chloroform, there is added dropwise with vigorous stirring a solution of 12 g. of heptanoyl chloride in 50 ml. of chloroform. The reaction mixture is then heated to reflux for 20 hours. The cooled reaction mixture is diluted with 300 ml. of ether and added slowly with vigorous stirring to a solution og 8.4 g. of sodium bicarbonate in 200 ml. of water. The organic layer is separated, washed with water, dried over anhydrous magnesium sulfate and concentrated to yield the desired ester. The ester is dissolved in anhydrous ether and treated with a solution of hydrogen chloride in ether to precipitate the desired 4-{3-[1,3,4-trifluoro-2-(trifluoromethyl)-10-phenothiazinyl]propyl} - 1 - piperazineethyl heptanoate, dihydrochloride.

Example 12.—Preparation of 10 - [3 - (dimethylamino) propyl] - 1,3,4,6,7,8,9-heptafluorophenothiazine, hydrochloride (a) Following the procedure of Example 3a, b, c, and d, but substituting 2,4,5-trifluoroaniline for the 2,3,4,5-tetrafluoroaniline, there is obtained 2 - amino-3,5,6-trifluorobenzenethiol.

(b) Following the procedure of Example 4 but substituting 2-amino-3,5,6-trifluorobenzenethiol for the 2-aminobenzenethiol, there is obtained the desired 10-[3-

(dimethyl)propyl] - 1,3,4,6,7,8,9 - heptafluorophenothiazine, hydrochloride.

Example 13.—Preparation of 10-[3 - (dimethylamino)propyl] - 2,6,7,8,9 - pentafluorophenothiazine, hydrochloride Following the procedure of Example 4 but substituting 2-amino-4-fluorobenzenethiol for the 2 - aminobenzenethiol, there is obtained the desired 10-[3-(dimethyl)propyl] - 2,6,7,8,9 - pentafluorophenothiazine, hydrochloride.

Example 14.—Preparation of 4 - {3-[1,3,4-trifluoro-2-trifluoromethyl)-10-phenothiazinyl]propyl} - 1 - piperazineethyl dodecanoate, dihydrochloride Following the procedure of Example 11 but substituting dodecanoyl chloride for the heptanoyl chloride, there is obtained the desired 4-{3-[1,3,4-trifluoro-2-(trifluoromethyl) - 10 - phenothiazinyl]propyl}-1-piperazineethyl dodecanoate, dihydrochloride.

Example 15.—Preparation of 2-chloroethyl-1,2,3,4-tetrafluorophenothiazin-10-yl ketone A mixture of 13.5 g. of 1,2,3,4-tetrafluorophenothiazine, 11.7 g. of β-chloropropionyl chloride and 150 ml. of dry toluene is refluxed for 4 hours, treated with decoloring carbon, and concentrated to leave as a residue the crude 2-chloroethyl 1,2,3,4-tetrafluorophenothiazin-10-yl ketone. This material may be purified by crystallization from heptane.

Example 16.—Preparation of 2-(dimethylamino)ethyl-1,2,3,4-tetrafluorophenothiazin-10-yl ketone A mixture of 10.4 g. of 2-chloroethyl-1,2,3,4-tetrafluorophenothiazin-10-yl ketone, 18.0 g. of anhydrous dimethylamine and 50 ml. of toluene is heated in a sealed tube at 100° for 24 hours. The reaction mixture is then filtered, the filtrate concentrated, and the oily residue dissolved in 100 ml. of ether. The ether solution is extracted with 100 ml. of 5% aqueous hydrochloric acid, the extract made alkaline, and the mixture extracted with ether. The ether extract is dried over anhydrous sodium sulfate and the ether then removed by distillation. The residue is the desired 2-(dimethylamino)ethyl-1,2,3,4-tetrafluorophenothiazin-10-yl ketone.

It may be purified by treating an ethereal solution of the base with an ethereal solution of hydrogen chloride and crystallizing the hydrochloric acid salt thus obtained, from a mixture of absolute ethanol and anhydrous ether.

Example 17.—Preparation of 10-(3-chloropropyl)-1,2,3,4,-tetrafluorophenothiazine A solution of 4.7 g. of 2-chloroethyl-1,2,3,4-tetrafluorophenothiazin-10-yl ketone in 200 ml. of anhydrous ether is added, in a nitrogen atmosphere, to a stirred suspension of 0.74 g. of lithium aluminum hydride in 75 ml. of anhydrous ether. The addition requires 30 minutes and the reaction mixture is stirred and heated under reflux for an additional hour. The reaction mixture is then cooled to 5° and 3 ml. of water is added dropwise with vigorous stirring, followed by the addition of 3 ml. of 10% aqueous sodium hydroxide. The ethereal solution is filtered from the inorganic solids, and the filtrate washed with water, and dried over anhydrous magnesium sulfate. After filtration, the ether is removed by distillation to leave as a residue the desired 10-(3-chloropropyl)-1,2,3,4-tetrafluorophenothiazine.

Example 18.—Alternate preparation of 10-[3-(dimethylamino)propyl]-1,2,3,4-tetrafluorophenothiazine, hydrochloride A solution of 3.5 g. of 2-(dimethylamino)ethyl-1,2,3,4-tetrafluorophenothiazin-10-yl ketone in 200 ml. of anhydrous ether is added over a period of 30 minutes to a stirred slurry of 0.8 g. of lithium aluminum hydride in 50 ml. of anhydrous ether. The addition is carried out in an atmosphere of nitrogen. The reaction mixture is stirred and heated under reflux for an additional hour and is then cooled at 5°. Five ml. of water is added dropwise, followed by the addition of 5 ml. of 10% aqueous sodium hydroxide. The ethereal solution is filtered from the inorganic salts, washed with water and dried over anhydrous magnesium sulfate. After filtration, the ether solution is treated with an ethereal solution of hydrogen chloride to precipitate the hydrochloride of 10-[3-(dimethylamino)propyl] - 1,2,3,4 - tetrafluorophenothiazine, which may be purified by crystallization from a mixture of absolute ethanol and anhydrous ether.

What is claimed is:

1. A compound selected from the group consisting of a base of the formula

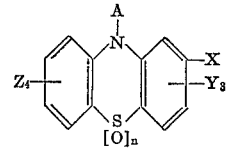

and a non-toxic salt thereof, wherein X is selected from the group consisting of hydrogen, fluorine and trifluoromethyl; Y and Z are each selected from the group consisting of hydrogen and fluorine, at least one of Y and Z being fluorine; $n$ is 0, 1 or 2; A is selected from the group consisting of ethylene and propylene; and B is a member of the group consisting of dimethylamino, $N^4$-ethanolpiperazino, and $N^4$-alkanoyloxyethylpiperazino wherein the alkanoyl moiety contains from 7 to 12 carbon atoms.

2. A compound selected from the group consisting of a base of the formula

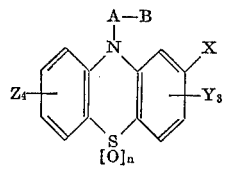

and non-toxic salt thereof, wherein X is selected from the group consisting of hydrogen, fluorine and trifluoromethyl; Y and Z are each selected from the group consisting of hydrogen and fluorine, at least one of Y and Z being fluorine; $n$ is 0, 1 or 2; A is a lower alkylene radical of at least two carbon atoms; and B is a member of the group consisting of amino, (lower alkyl) amino, di-(lower alkyl) amino, (hydroxy-lower alkyl) amino, di-(hydroxy-lower alkyl) amino, (phenyl-lower alkyl) amino, (lower alkyl)(phenyl-lower alkyl) amino, and a heterocyclic radical having 5 to 7 atoms selected from the group consisting of piperidino, (lower alkyl) piperidino, hydroxy piperidino, (lower alkoxy) piperidino, pyrrolidino, (lower alkyl) pyrrolidino, (lower alkoxy) pyrrolidino, morpholino, (lower alkyl) morpholino, (lower alkoxy) morpholino, thiamorpholino, (lower alkyl) thiamorpholino, (lower alkoxy) thiamorpholino, piperazino, $N^4$-(lower alkyl) piperazino, $N^4$-(lower alkoxy) piperazino, $N^4$-(hydroxy-lower alkyl) piperazino, $N^4$-(alkanoyloxy-lower alkyl) piperazino, $N^4$-(hydroxy-lower alkoxy, lower alkyl) piperazino, $N^4$-[di(lower alkyl) amino-(lower alkoxy-lower alkyl)] piperazino, homopiperazino, $N^4$-ethylhomopiperazino, $N^4$-benzylhomopiperazino, and $N^4$-(hydroxyethyl) homopiperazino, wherein the alkanoyloxy group contains up to 14 carbon atoms.

3. A compound according to claim 1 having the name 4-{3-[1,3,4-trifluoro-2 - (trifluoromethyl) - 10-phenothiazinyl]-propyl}-1-piperazine ethanol, dihydrochloride.

4. A compound according to claim 1 having the name 4-{3-[1,3,4-trifluoro-2 - (trifluoromethyl) - 10-phenothiazinyl]-propyl} - 1 - piperazineethyl heptanoate, dihydrochloride.

5. A compound according to claim 1 having the name 4-{3-[1,3,4-trifluoro-2 - (trifluoromethyl) - 10-phenothiazinyl]-propyl} - 1-piperazineethyl dodecanoate, dihydrochloride.

6. A compound according to claim 1 wherein B is (lower alkyl)amino.

7. A compound according to claim 1 having the name 10-[3-(dimethylamino)propyl] - 1,3,4-trifluoro-2-(trifluoromethyl)-phenothiazine hydrochloride.

References Cited

UNITED STATES PATENTS 3,260,717   7/1966   Craig _____ 260—243

HENRY R. JILES, *Primary Examiner.*

H. I. MOATZ, *Assistant Examiner.*

U.S. Cl. X.R.

167—65

UNITED STATES PATENT OFFICE
CERTIFICATE OF CORRECTION

Patent No. 3,419,553                        December 31, 1968

Jack Bernstein et al.

It is certified that error appears in the above identified patent and that said Letters Patent are hereby corrected as shown below:

Column 1, after line 49, insert -- (lower alkyl)piperidino]; hydroxy piperidino; (lower --. Column 2, line 11, "mehtods" should read -- methods --; Column 5, line 23, "tetrafluoroenzenesulfonic" should read -- tetrafluorobenzenesulfonic --. Column 9, line 1, "(dimethyl)" should read -- (dimethylamino) --; line 33, "10.4" should read -- 14.0 --. Column 10, the first formula should appear as shown below:

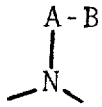

Signed and sealed this 19th day of May 1970.

(SEAL)
Attest:

Edward M. Fletcher, Jr.                      WILLIAM E. SCHUYLER, JR.

Attesting Officer                                Commissioner of Patents